US006503635B1

(12) United States Patent
Kong et al.

(10) Patent No.: US 6,503,635 B1
(45) Date of Patent: Jan. 7, 2003

(54) METALLIZED MULTI-LAYER FILM

(75) Inventors: Dan-Cheng Kong, Fairport, NY (US); Donald F. Sexton, Fairport, NY (US)

(73) Assignee: Exxon Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/435,558

(22) Filed: Nov. 8, 1999

(51) Int. Cl.$^7$ .......................... B32B 15/08; B32B 27/32
(52) U.S. Cl. ..................... 428/461; 428/516; 428/910
(58) Field of Search ..................... 428/516, 461, 428/910

(56) References Cited

U.S. PATENT DOCUMENTS

| | | | |
|---|---|---|---|
| 4,186,240 A | | 1/1980 | Matsuda et al. ............ 428/349 |
| 4,243,708 A | * | 1/1981 | Eustance et al. ............ 428/141 |
| 4,857,409 A | * | 8/1989 | Hazelton et al. ............ 428/494 |
| 4,888,237 A | | 12/1989 | Balloni et al. .............. 428/347 |
| 5,049,436 A | | 9/1991 | Morgan et al. ............. 428/213 |
| 5,153,074 A | | 10/1992 | Migliorini .................. 428/463 |
| 5,252,384 A | | 10/1993 | Both et al. ................. 428/212 |
| 5,888,648 A | | 3/1999 | Donovan et al. ........... 428/349 |
| 5,958,566 A | * | 9/1999 | Wheat et al. .............. 428/215 |
| 6,106,933 A | * | 8/2000 | Nagi et al. ................ 428/212 |
| 6,190,760 B1 | * | 2/2001 | Nagi et al. ................ 428/213 |

FOREIGN PATENT DOCUMENTS

| | | |
|---|---|---|
| EP | 0620114 | 10/1994 |
| EP | 0716121 | 6/1996 |
| JP | 4707266516 | * 9/1995 |
| WO | 00/58088 | 10/2000 |

OTHER PUBLICATIONS

Database WPI, Section CH, Week 199550, Derwent Publications Ltd., London; GB; AN 1995–389545; XP002161242 & JP 07 266516 A (Toray Ind Inc), Oct. 17, 1995, abstract.

Database WPI, Section CH, Week 198540, Derwent Publications Ltd., London; GB; AN 1985–246476; XP002161243 & JP 60 162645 A (Tokuyama Soda KK) Aug. 24, 1985, abstract.

Database WPI, Section CH, Week 199551, Derwent Publications Ltd., London; GB; AN 1995–400309; XP002161244 & JP 07 276585 A (Toray Ind Inc), Oct. 24, 1995, abstract.

Database WPI, Section CH, Week 199946, Derwent PublicationS Ltd., London; GB; AN 1999–544506; XP002161245 & JP 11 235796 A (Achilles Corp KK), Aug. 31, 1999, abstract.

Database WPI, Section CH, Week 199522, Derwent Publications Ltd., London; GB; AN 1995–166945; XP002161246 & JP 07 089022 A (Mitsui Toatsu Chem Inc), Apr. 4, 1995, abstract.

Database WPI, Section CH, Week 199009, Derwent Publications Ltd., LondON; GB; AN 1990–064078; XP002161247 & JP 02 018044 A (Chisso Corp), Jan. 22, 1990, abstract.

* cited by examiner

Primary Examiner—D. Lawrence Tarazano
(74) Attorney, Agent, or Firm—Rick F. James; Keith A. Bell

(57) ABSTRACT

A metallized biaxially oriented film has at least one polypropylene layer and a metallized skin layer. This skin layer is formed from a blend of polymers including syndiotactic polypropylene. The polymer which is blended with the syndiotactic polypropylene may be a butylene-propylene copolymer or a graft copolymer of propylene and maleic anhydride. The film may include a separate non-metallized biaxially oriented film laminated to the metallized biaxially oriented film. The metal layer provides a barrier to oxygen and water vapor. The metallized film can be processed through package forming machines without damage to the metal barrier layer.

14 Claims, 1 Drawing Sheet

METALLIZED MULTI-LAYER FILM

BACKGROUND

The present invention relates to the art of packaging using multi-layer films, and, in particular, to a new composite multi-layer film for providing an oxygen and water vapor barrier to multi-layer film packages.

Packaging technology has over the years required the development of many disciplines. Currently, packaging technologists integrate elements of engineering, chemistry, food science, metallurgy, and other technologies in order to provide the consumer fresh, healthy food product. In those cases where packages are prepared from multi-layer film, it is desirable to be able to provide a barrier which does not permit passage of air or water vapor.

In recent years, containers produced out of multiple-layer flexible film, such as bags and pouches, predominate the marketplace. In order to utilize continuous multiple-layer flexible film, the industry generally employs form/fill/seal packaging techniques. The type of product packaged dictates whether or not the technique will include horizontal form/fill/seal packaging (HFFS) or vertical form/fill/seal packaging (VFFS).

It is important for the packaging artisan to be able to select a multi-layer film having optimum barrier properties for storage of the food items and be confident of providing a high quality seal using high speed packaging apparatus. For example, it is known that stereoregular polypropylene, e.g., oriented polypropylene, is quite useful in the manufacture of packages from flexible films. Using oriented polypropylene as a core layer, additional layers in the way of coatings, co-extrusions, laminations, and combinations thereof are added to improve barrier properties of the film. In certain cases, films can be prepared which exclude moisture and oxygen, but permit the passage of light. In other cases, it is also important to prevent light from passing through the film barrier. Barrier properties can also be modified and/or enhanced by treatments such as heat and flame treatment, electrostatic discharge, chemical treatments, halogen treatment, ultra-violet light, and combinations thereof A primary concern for designing multiple-layer films for packaging is to ensure they can be processed on high speed form/fill/seal machinery. Form/fill/seal package apparatus operates by unwinding continuous film from bulk film rolls, followed by forming pouches therefrom, filling the pouches, and, finally, sealing the pouch closed. Thus, the film must have sufficient flexibility to undergo machine folding from a flat orientation to a folded condition, and be subjected to a sealing function which is part of high-speed packaging apparatus. In selecting the optimum multi-layer film for its barrier properties, high-speed unrolling and folding are a primary concern. An additional, and very important aspect of the packaging process, however, is the ability to effectively seal the pouch after it is filled with the product.

High-speed horizontal and vertical form/fill/seal apparatus include sealing functions at various stages of the packaging process. In a horizontal form/fill/seal apparatus, individual pouches are formed by folding the multi-layer film in half followed by providing vertical seals along the length of the folded web and separating the pouches along the seals formed by vertical sealing. (Optionally, the bottoms of the pouches can also be sealed). After the pouch thusly formed is filled, the top of the pouch is sealed.

Similarly, in vertical form/fill/seal apparatus, the continuous web is formed around a tube and the web is immediately joined together by a longitudinal sealing jaw as either a lap seal or a fin seal. A lap seal is depicted schematically in FIGS. 1 and 1a of U.S. Pat. No. 5,888,648 to Donovan, et al. A fin seal is depicted schematically in FIGS. 2 and 2a of U.S. Pat. No. 5,888,648.

A second sealing function is present in a VFFS configuration which consists of a combination top- and bottom-sealing section (with a bag cut-off device in between). The top-sealing portion seals the bottom of an empty bag suspended from the bag forming tube while the bottom portion seals the top of a filled bag.

As a consequence of processing high-barrier property multi-layer films in high speed form/fill/seal apparatus, damage can occur metallized layers for providing a barrier to oxygen and water vapor.

In order, therefore, to provide high-barrier multi-layer film with hermetic seals, several factors must be considered. It is important to provide a sealing capability at as low a temperature as possible in order to retain, among other things, stereoregularity imposed during orientation, little or no film shrinkage, retention of film and/or chemical additive properties, and highly consistent quality sealing capabilities. Furthermore, the film must have surface characteristics which permit it to be readily used on high-speed machinery. For example, the coefficient of friction must be such that it can be readily unrolled from a high volume roll of film and passed through the packaging machinery. Undesirable sticking or friction characteristics can cause bag imperfections and interruption of high-speed processing. Moreover, seals formed during process must have good seal strength.

More recently, the packaging artisan has been concerned with the ability to provide quality seals which preserve the freshness of the contents while providing the consumer with an easily openable and reclosable container. Innovations to date have been primarily concerned with the components of the seal material. For example, U.S. Pat. No. 3,202,528 to James describes a oriented polypropylene film having an adherent heat-sealable coating which includes a material from the group consisting of copolymers of vinylidene chloride and acrylonitrile, copolymers of vinyl chloride and vinyl acetate, chlorinated rubbers, nitrocellulose and polyamide which melts below 160° C. and an acidic material provided in an amount of about 20 to about 60% by weight of the film forming material. This adhesive is coated and dried on the film. U.S. Pat. No. 4,020,228 to Eastes describes a gel composition which provides a heat sealable surface to polyolefinic materials or cellulosic sheet materials. U.S. Pat. No. 4,121,956 discloses an ionomer adhesive adhered to an outer ionomeric surface of package wrapping for attachment of labels.

U.S. Pat. No. 4,292,882 discloses an oriented heat-sealable anti-static polypropylene film manufactured by applying to a surface of a base polypropylene film a heat-sealable olefinic polymer containing between 0.2 and 10% by weight of an anionic hydrocarbyl sulfonate. Andrews, et al. also provide that a slip agent can be incorporated for ease of handling.

U.S. Pat. No. 4,389,450 to Schaefer, et al. describes a multi-layer packaging film in which the outer polymeric layers cooperate to provide a relatively constant coefficient of friction differential. This enhances the ability to use the film in high speed processing to form fin seal and lap seals. Schaefer, et al. have addressed the problem of providing the proper coefficient of friction for use of the film in high-speed processing apparatus.

U.S. Pat. No. 5,049,436 to Morgan, et al. discloses a multi-layer film which is hermetically heat sealable over a broad temperature range. The Morgan, et al. patent describes a heat-sealable layer which includes an ethylene-propylene copolymer and/or an ethylene-propylene-butene terpolymer with an inorganic anti-block agent and a fatty acid amide.

U.S. Pat. No. 5,153,074 to Migliorini discloses a high barrier film which has been metallized. The Migliorini '074 patent describes a metallized multi-layer film having a polymer substrate at least one surface of which includes a maleic anhydride modified polypropylene homopolymer or copolymer, and at least one surface having a skin layer thereon of ethylene-vinyl alcohol copolymer, such skin layer having an aluminum layer directly thereon. The ethylene-vinyl alcohol copolymer layer provides excellent oxygen barrier properties and is described as ranging in thickness from 3 to 30 gauge units.

U.S. Pat. No. 5,888,648 to Donovan, et al. discloses a multi-layer film which is hermetically heat sealable. The thickness and composition of layers are selected to avoid tunneling in seals, as well as to avoid z-direction tears when sealed bags are opened.

While the references set forth above as well as other references and disclosures in the art of film packaging disclose attempts to overcome specific problems identified in high-speed packaging using multi-layer films, none of the references provide a technological solution which simultaneously provides rapid formation of an excellent hermetic seal in form/fill/seal packaging apparatus while avoiding damage to the barrier layer during the packaging process.

Therefore, the present invention is intended to provide an improved multi-layer film structure and a method for improving multi-layer film structures to overcome the problems set forth above and other problems associated with form/fill/seal processing.

SUMMARY

There is provided a metallized biaxially oriented film comprising:

(a) at least one polypropylene layer; and (b) a metallized skin layer comprising (i) a blend of syndiotactic polypropylene and butylene-propylene copolymer; or (ii) a blend of syndiotactic polypropylene and a graft polymer of a propylene polymer and maleic anhydride.

DETAILED DESCRIPTION

Figure 1:
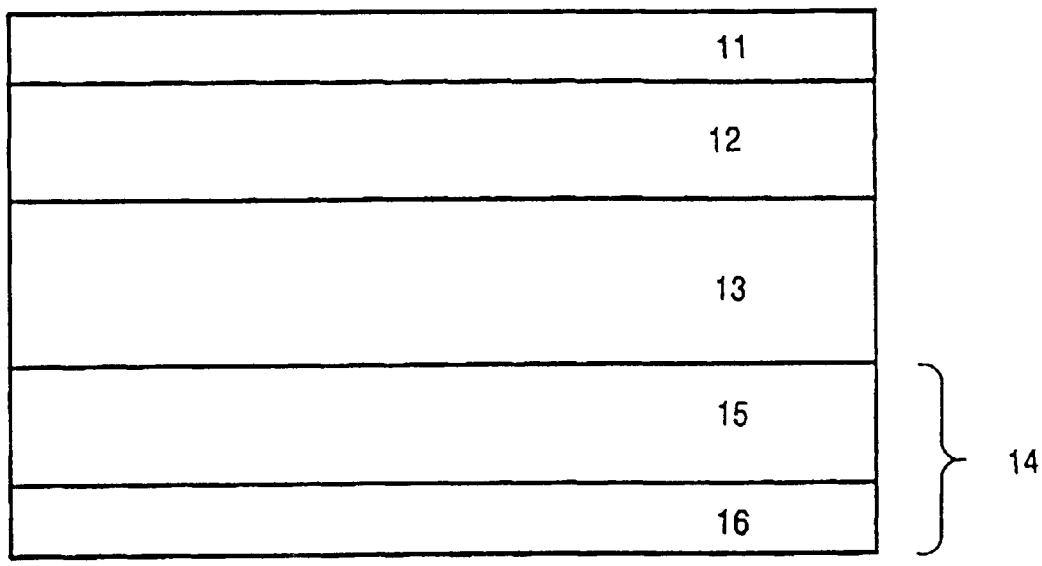
FIG. 1 is an exaggerated cross-section of metallized, biaxially oriented, polypropylene multi-layer film.

In FIG. 1, a metal layer 11 is applied to a skin layer 12. The metal layer 11 can be aluminum.

The skin layer 12 comprises either (i) a blend of syndiotactic polypropylene and butylene-propylene copolymer; or (ii) a blend of syndiotactic polypropylene and a graft polymer of a propylene polymer and maleic anhydride.

The syndiotactic polypropylene in these blends (i) and (ii) may be Fina EOD95-02 sold by Fina Oil Company. This syndiotactic polypropylene may be a metallocene-catalyzed syndiotactic polypropylene. By the phrase "metallocene-catalyzed syndiotactic polypropylene," it is meant that the syndiotactic polypropylene possesses a molecular structure that corresponds or substantially corresponds to a syndiotactic polypropylene obtained by using an appropriate metallocene catalyst in the polymerization of propylene.

The syndiotactic polypropylene polymers may have a very slow crystallization rate. This rate is so slow as to produce unacceptable hot tack and to give the polymers unacceptable sealing characteristics when used alone for heat sealable film applications. These polymers have different characteristics from the characteristics inherent in films with good heat sealability.

The metallocene-catalyzed syndiotactic polypropylene resins are commercially available, but may be produced according to known methods. Such methods are described in, e.g., U.S. Pat. Nos. 5,162,278; 5,158,920; 5,155,080; 5,036,034; 4,975,403; 4,892,851; 4,794,096; 5,055,438; 5,153,157; 5,057,475; 5,198,401; 5,278,119; and in *Organometallics*, 13(3), pp. 954–96, which are incorporated by reference herein.

The syndiotactic polypropylene preferably has a melt flow (ASTM D1238) of about 1 to about 15 g/10 minutes, preferably about 2 to about 10 g/10 minutes, most preferably about 4 to about 7 g/10 minutes. Additionally, the syndiotactic polypropylene may have a syndiotacticity of about 70–90% based on racemic pentads and 80–98% based on racemic dyads (measured according to $^{13}C$ NMR spectroscopy), preferably 75–85% based on racemic pentads.

The butylene-propylene copolymer of blend (i) in skin layer 12 may be Cefor 188 sold by Union Carbide. The mole percent ratio of butylene comonomer in this copolymer may be from 1% to 20%. The butylene-propylene copolymer may have a melting point from 130° C. to 160° C. and a melt flow rate from 1 to 10 g/10 min.

The graft polymer of a propylene polymer and maleic anhydride of blend (ii) in skin layer 12 may be AT111152A or ADMER QF500A sold by Mitsui. The mole percent of maleic anhydride in this graft polymer may be from 0.1% to 60%. The graft polymer of the propylene polymer and maleic anhydride may have a melting point of about 140° C. to 170° C., a density of about 0.89 g/cc to 0.92 g/cc and a melt flow rate of from 1 to 10 g/10 min.

The propylene polymer of this graft polymer may be a polypropylene homopolymer or copolymer of propylene with one or more comonomers. These comonomers may be ethylene, butylene, pentene, methylpentene, and the like. This propylene polymer may have at least 80 mole percent propylene and 20 mole percent of one or more comonomers, in terms of monomeric units. Particular propylene polymers are propylene homopolymers and ethylene-propylene copolymers.

The graft copolymer of ethylene-propylene and maleic anhydride of blend (ii) in skin layer 12 may be ADMER QF551A (melt index=5.7 g/10 min.) sold by Mitsui.

The weight ratio of syndiotactic polypropylene to butylene-propylene copolymer in blend (i) may be from 90:10 to 10:90.

The weight ratio of syndiotactic polypropylene to graft copolymer of a propylene polymer and maleic anhydride in blend (ii) may be from 90:10 to 10:90.

In FIG. 1, layer 13 is a polypropylene layer. The polypropylene of this layer 13 may be the homopolymer Fina 3371 sold by the Fina Oil Company. The polypropylene of layer 13 may be a homopolymer or a copolymer. Propylene homopolymers for layer 13 include isotactic polypropylene, preferably 80–100% isotactic polypropylene, most preferably about 95% isotactic polypropylene. The propylene homopolymers preferably have a melt flow (measured in accordance with the standard ASTM D1238 method) ranging from about 1.2 to about 10 g/10 minutes, most preferably from about 2.5 to about 6 g/10 minutes. Particular propylene copolymers include (98–93)/(2–7) propylene/ethylene copolymers.

When coextruded, the skin layer 12 adheres well to the polypropylene layer 13. Accordingly, a tie layer or an adhesive layer is not needed to laminate the skin layer 12 to the polypropylene layer 13. However, such a tie layer or adhesive (not shown in FIG. 1) may be optionally used.

Figure 2:
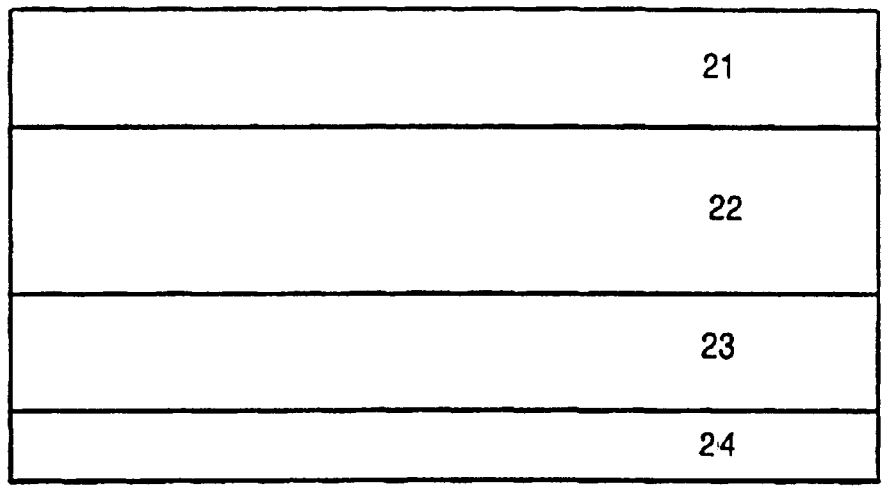
FIG. 2 is an exaggerated cross-section of non-metallized multi-layer film, which may, optionally, be laminated to the metallized film shown in FIG. 1.

On the opposite side of the polypropylene layer 13 from the skin layer 12 is provided one or more under layers 14 adapted for forming a heat seal in a packaging apparatus or for providing a surface suitable for lamination onto another multi-layer film, such as the film described in FIG. 2. When a single layer 14 is used, this layer 14 may comprise a terpolymer of ethylene, propylene and butylene; an ethylene-propylene copolymer; a metallocene catalyzed polyethylene; or mixtures thereof Preferably, two under layers 14 are used. These two layers are shown as layer 15 and layer 16 in FIG. 1. Layer 15 may comprise a terpolymer of ethylene, propylene and butylene; an ethylene-propylene copolymer; a metallocene catalyzed polyethylene; or mixtures thereof An example of such as terpolymer is Chisso 7510 sold by the Chisso Chemical Company of Japan. Chisso 7510 has a melting point of 131° C. The terpolymer of layer 15 may be composed of, for example, 3 mole % ethylene, 94 mole % propylene and 3 mole % butene-1.

The terpolymer of layer 15 may, optionally, be blended with a linear low density polyethylene (LLDPE), such as LL3003 sold by Exxon. The weight percent of LLDPE, based on total LLDPE plus terpolymer, may be from zero to 70%.

Layer 16 may comprise a terpolymer of ethylene, propylene and butylene; an ethylene-propylene copolymer; a polyethylene, such as metallocene catalyzed polyethylene; or mixtures thereof The polymer of layer may have a melting point lower than the melting point of the polymer in layer 15. An example of a terpolymer for use in layer 16 is Chisso 7701 sold by the Chisso Chemical Company of Japan. Chisso 7701 has a melting point of 126° C. The terpolymer of layer 16 may be composed of, for example, 2 mole % ethylene, 83.5 mole percent propylene and 14.5 mole % butene-1.

Metallocene catalyzed polyethylenes may be used in the outer layer 16, particularly in view of their adhesion performance. Such metallocene catalyzed polyethylene includes homopolymers as well as copolymers, and may be produced according to known polymerization techniques. Typically, ethylene and optional comonomers are contacted with a catalyst composition comprising at least one metallocene compound and at least one activator under polymerization conditions.

The activators that may be used in combination with the metallocene compounds include, but are not limited to, aluminoxanes and substituted aluminoxanes as well as various ionic compounds.

The metallocene catalyzed polyethylene in layer 16 may have a melt index of about 0.1 to about 10 g/10 minutes (measured in accordance with ASTM D1238), a density of about 0.88 to about 0.965 g/cm$^3$, a polydispersity $M_w/M_n$ of about 2 to about 10, and a melting point of about 90 to about 140° C.

Commercially available metallocene catalyzed polyethylenes include Dow AFFINITY PL-1840 and DPF-1340 and Exxon EXXACT 3027. In comparison to traditional Ziegler-Natta catalyzed propylene copolymer and terpolymer materials, metallocene catalyzed polyethylene materials exhibit significantly narrower molecular weight distributions.

Layer 16 may, optionally, be provided with one or more anti-blocking agents. Examples of such anti-blocking agents include Epostar 1010 and siloid 44. Epostar 1010 is sold by Nippon Shokubai, and this anti-blocking agent is composed of spherical, cross-linked copolymers of methyl methacrylate and propylidene trimethacrylate with a particle size (i.e. average diameter) of about 7–11 microns.

Siloid 44 is a silica antiblocking agent. The average particle size is about 4–5 microns. Oil adsorption is about 300 (g/100 g). The pH value is about 6–8. Siloid 44 is made by the Grace Davison Company.

Layer 12 may have a thickness of 2–5 gauges. Layer 13 may have a thickness of 40–100 gauges. Layer 15 may have a thickness of 15–45 gauges. Layer 16 may have a thickness of 3–10 gauges. The metal layer 11 may have a thickness of 300 to 500 angstroms.

Layers 12, 13, 15 and 16 may be laminated together by a coextrusion process before the metal layer 11 is applied. The metal layer 11 may be applied by chemical vapor deposition.

Deposited metal layers are well known in the art, and can be deposited using any known method, for instance, vacuum deposition, electroplating, sputtering, etc. Preferably, the metal layer is one of vacuum-deposited aluminum, copper, silver, chromium, gold, and mixtures thereof, with aluminum being most preferred.

The metallized multi-layer films of the present invention retain excellent barrier properties against oxygen and water vapor transmission, even after being processed through a packaging machine, such as a VFFS machine. For example, the oxygen transmission rate (OTR) of the multi-layer film of the present invention may be less than 5 cc/100 in$^2$/24 hours (as measured by Mocon 1000 at 0% relative humidity and 23° C.), while the water vapor transmission rate (WVTR) may be less than 0.06 g/100 in$^2$/24 hours (as measured by Mocon W600 at 90% relative humidity and 38° C.), even after the film is processed through a packaging machine at an accelerated rate.

Oxygen transmission rate may be measured by a reliable method, such as ASTM D3985. In particular, OTR may be measured with a Mocon OXYTRAN 1000 instrument (available from Modern Controls, Inc., Elk River, Minn.) at 23° C. and 0% relative humidity.

Water vapor transmission rate may also be measured by a reliable method, such as ASTM F1249. In particular, WVTR may be measured with a Mocon PERMATRAN W600 instrument (available from Modern Controls, Inc., Elk River, Minn.) at 38° C. and 90% relative humidity.

In order to modify or enhance certain properties of multi-layer films, it is possible for one or more of the layers to contain appropriate additives in effective amounts. Such additives include, but are not limited to anti-blocks, antistatic agents, coefficient of friction (COF) modifiers, processing aids, colorants, clarifiers, and other additives known to those skilled in the art.

Also, one or more of exposed layers of multi-layer films can be surface-treated to render the films receptive to printing inks, adhesives and/or coatings. These surface-treated layers may subsequently laminated onto other films or surfaces. The surface treatment can be carried out by any method known in the art such as corona discharge treatment or flame treatment.

Optionally, a coating may be applied to one or both of the exposed surfaces of outermost layers of a film to facilitate lamination. Prior to application of the coating material, the film may be surface treated or may be primed with a primer layer. Appropriate coatings contemplated include acrylic coatings such as those described in U.S. Pat. Nos. 3,753,769 and 4,865,908, both of which are incorporated herein by reference, and PVDC coatings such as those described in U.S. Pat. Nos. 4,214,039; 4,447,494; 4,961,992; 5,019,447 and 5,057,177, all of which are incorporated herein by reference. A vinyl alcohol polymer may also be used as a coating composition, such as VINOL 325, available from Air Products Inc.

Appropriate primer materials are poly(ethyleneimine), epoxy primers, and the like.

The outer surface of a film may be treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, and the like. Although any of these techniques are effectively employed to pretreat the film surface, a particularly desirable method of treatment is the so-called corona treatment method which comprises exposing the film surface to a high voltage corona discharge while passing the film between a pair of spaced electrodes. After corona treatment of the film surface, the coating composition is then applied thereto.

Treated or untreated surfaces may be laminated together with a suitable adhesive, e.g., a hot melt adhesive such as low density polyethylene, ethylene-methacrylate copolymer, water-based adhesives such as polyvinylidene chloride latex, and the like.

The extruded film can be stretched in the machine direction, coated with a coating composition and then stretched perpendicularly in the transverse direction. In yet another embodiment, coating can be carried out after biaxial orientation is completed.

The film of the invention may have a total thickness ranging from about 0.2 mil to about 5 mils, specifically from about 0.4 mil to about 2.5 mils.

Multi-layer films may be prepared employing commercially available systems for coextrusion.

It is preferred that layers containing polypropylene are coextruded. Thereafter, the film is biaxially oriented. Specifically, the polymers are brought to the molten state and coextruded from a conventional extruder through a flat sheet die, the melt streams are combined in an adapter prior to being extruded from the die or within the die. After leaving the die, the multi-layer web is chilled and the quenched web is reheated and oriented. The film is oriented by biaxially stretching the film. The film can be oriented by stretching from about 3 to about 11 times in the machine direction at temperatures ranging from about 105° C. to about 150° C. and from about 3 to about 12 times in the transverse direction (TD) at temperatures ranging from about 150° C. to about 165° C.

FIG. 2 shows an example of a second multi-layer film, which may, optionally, be laminated to the multi-layer film shown in FIG. 1. This lamination helps to protect the metal layer. This lamination also serves to enhance the structural stiffness of the film to aid in the passing of the film through the packaging machine.

Layer 21 of FIG. 2 is adapted to be laminated onto the metallized, multi-layer film of FIG. 1 by an adhesive or a tie layer. Layer 21 may be composed of a terpolymer of ethylene, propylene and butylene, such as Chisso 7502 sold by the Chisso Chemical Company of Japan. Layer 21 may have a thickness of about 5 gauges.

Layer 22 of FIG. 2 is a polypropylene layer which may have the same composition and thickness as the polypropylene layer 13 of FIG. 1. Similarly, layer 23 of FIG. 2 may have the same composition and thickness as layer of FIG. 1, and layer 24 of FIG. 2 may have the same composition and thickness as layer of FIG. 1. Layers 23 and 24 are adapted to form a heat seal during the packaging process.

EXAMPLE 1

In this Example a laminated film structure is prepared from a metallized four layer coextruded biaxial oriented film laminated with polyurethane adhesive to a 90 gauge (23 um) biaxially oriented polypropylene (BOPP) film, available from Mobil Chemical Company as 90SPW-L. The order of layers in the metallized film is referred to herein as A/B/C/ID for the four layers. Layers A/B/C/D correspond to layers 12/13/15/16, respectively, of FIG. 1. Skin layer A (layer 12) was prepared from a blend of butylene-propylene copolymer with a syndiotactic polypropylene. More particularly, this blend was 60 wt % Cefor (butylene-propylene copolymer) sold by Union Carbide with 40 wt % Fina EOD94–02 (syndiotactic polypropylene) sold by the Fina Oil Company. Inner layer B (layer 13), which was between layer A and C (layer 12 and 15), was prepared from Fina 3371 polypropylene sold by Fina Oil company. Layer C (layer 15), which was between layers B and D (layers 13 and 16), was prepared from Chisso 7510 ethylene-propylene-butene terpolymer sold by the Chisso Chemical Company of Japan. Outer layer D (layer 16) was prepared from a blend of an ethylene-propylene-butene terpolymer with 5000 ppm methyl methacrylate and propylidene trimethacrylate copolymer spheres and 2400 ppm of $SiO_2$. More particularly, the ethylene-propylene-butene terpolymer was Chisso 7701 sold by the Chisso Chemical Company of Japan;, the copolymer spheres, which had a particle size of about 10 microns, were Epostar 1010 sold by Nippon Shokubai; and the $SiO_2$ was siloid 44 sold by W. R. Grace. The Epostar 1010 and siloid were used as anti-block agents. The four-layered film was oriented about 5 times in the machine direction and eight times in the transverse direction by the tenter frame process. Layer A was flame treated. Aluminum was deposited by vacuum metallization on the top of the treated Layer A.

EXAMPLE 2

The laminate of Example 1 was run through Hayssen Ultimum II vertical/form/fill/seal (VFFS) packaging machine. The machine was run at a speed of 55 packages per minute (ppm). Bags with a dimension of 5.25×7.5 inches were formed. Oxygen transmission rate (OTR) and water vapor transmission rate (WVTR) of the laminated film were measured before and after the film was passed through the VFFS machine. OTR was measured with a Mocon OXYTRAN 1000 instrument at 0% relative humidity and 23° C. WVTR was measured with Mocon PERMATRAN W600 instrument at 90% relative humidity and 38° C.

The results are summarized in Table 1.

EXAMPLE 3

The metallized four layer film, metallized -A/B/C/D, of Example 1 was laminated to a 90 gauge BOPP film with polyurethane adhesive. The 90 gauge BOPP film has layer structure order as E/F/G/H. Layer E is a 5 gauge polypropylene homopolymer loaded with 2000 ppm silicone spheres (Tospearl 145 from Toshiba, Japan) and 1000 ppm $SiO_2$. Layer F is a 45 gauge polypropylene homopolymer. Layer G is a 35 gauge polymer blend comprising 70 wt % LLDPE and 30 wt % ethylene-propylene-butene terpolymer. Layer H is a 5 gauge ethylene-propylene-butene terpolymer. The laminate layer structure is E/F/G/H/adhesive/metallized-A/B/C/D.

EXAMPLE 4

The laminate of Example 3 was run through Hayssen Ultimum II vertical/form/fill/seal (VFFS) packaging machine. The machine operation conditions were the same as Example 2. The results are summarized in Table 1.

EXAMPLE 5

The metallized four layer film, metallized-A/B/C/D, of Example 1 was laminated to a 90 gauge BOPP film with polyurethane adhesive. The 90 gauge BOPP film has the layer structure in order as P/Q/R/S. Layer P is a 5 gauge ethylene-propylene-butene terpolymer, Chisso 7502, sold by Chisso Chemical Company of Japan. Layer Q is a 45 gauge polypropylene homopolymer. Layer R is a 35 gauge polymer blend comprising 70 wt % LLDPE and 30 wt % ethylene-propylene-butene terpolymer. Layer S is a 5 gauge ethylene-propylene-butene terpolymer. The laminated layer structure is P/Q/R/S/adhesive/metallized-A/B/C/D.

EXAMPLE 6

The laminate of Example 5 was run through Hayssen Ultimum II vertical/form/fill/seal (VFFS) packaging machine. The machine operation conditions were the same as Example 2. The results are summarized in Table 1.

EXAMPLE 7

The laminate of Example 5 was run through Mirapak VFFS machine. A 1/64" anvil was installed on the machine to replace the forming collar. The laminate was passed through the top of the 1/64" anvil at the tension 3.5 lbs/per inch. The results are summarized in Table 1.

EXAMPLE 8

A metallized four layer film was prepared in the same manner as Example 1 with the exception that a different blend of polymers was used to prepared skin layer A (layer 12). Skin A of Example 8 was prepared from a blend of graft copolymer of propylene with maleic anhydride blended with a syndiotactic polypropylene. More particularly, this blend was 50 wt % Mitsui AT11152A (graft copolymer of polypropylene with maleic anhydride) sold by Mitsui with 50 wt % Fina EOD94-02 (syndiotactic polypropylene) sold by the Fina Oil Company. The resulting film may be described in terms of layers A/B/C/D (layers 12/13/15/16) as (50 wt % Mitsui AT11152A+50 wt % Fina EOD95-02 blend)/Fina 3371/Chisso 75 10/ (Chisso 7701+5000 ppm Epostar 1010+2400 ppm $SiO_2$ blend). The layer thickness of the metallized four layer film was 5 gauge/45 gauge/35 gauge/5 gauge. Aluminum metallization was applied on the top of layer A.

The metallized four layer film was laminated to a 90 gauge BOPP film, which was the same BOPP film as Example 5, with polyurethane adhesive.

EXAMPLE 9

The barrier properties of the laminated film of Example 8 were tested in the same manner as in Example 7. The results are summarized in Table 1.

EXAMPLE 10

The laminate of Example 3 was run through the 1/64" anvil and barrier properties were tested in the same manner as in Example 7. The results are summarized in Table 1.

EXAMPLE 11

A metallized four layer film of Example 8 was laminated to a 90 gauge BOPP of Example 3 with polyurethane adhesive. The barrier properties of Example 11 were tested in the same manner as in Example 7. The results are summarized in Table 1.

EXAMPLE 12

The laminate of Example 1 was run through the 1/64" anvil in the Mirapak VFFS packaging machine. The barrier properties of Example 12 were tested in the same manner as in Example 7. The results are summarized in Table 1.

EXAMPLE 13

The metallized four layer film of Example 8 was laminated to the non-metallized, four layer BOPP film of Example 1 with polyurethane adhesive. The laminate of Example 13 was run through the 1/64" anvil in the Mirapak VFFS packaging machine. The barrier properties of the laminated film of Example 13 were tested in the same manner as in Example 7. The results are summarized in Table 1.

EXAMPLE 14

The metallized four layer film of Example 8 was laminated to Mobil's 70 gauge BOPP film 70SPW-L with polyethylene by extrusion lamination process. The barrier properties of the laminated film of Example 14 were tested in the same manner as in Example 7. The results are summarized in Table 1.

Comparative Example 15

70 Met-HB, which was a 70 gauge metallized three layer BOPP film, available from Mobil Chemical Company, with metallization on an HDPE skin, was laminated to Mobil's 70 gauge BOPP film 70SPW-L with polyethylene by extrusion lamination process. The barrier properties of the laminated film of comparative Example 15 were tested in the same manner as in Example 7. The results are summarized in Table 1.

TABLE 1

| EXAMPLE | OTR BEFORE[1] | OTR AFTER[2] | WVTR BEFORE[3] | WVTR AFTER[4] |
|---|---|---|---|---|
| EX 2 | 0.80 | 0.77 | 0.01 | 0.01 |
| EX 4 | 1.05 | 1.21 | 0.01 | 0.01 |
| EX 6 | 1.61 | 1.14 | 0.02 | 0.01 |
| EX 7 | 0.98 | 0.99 | 0.01 | 0.01 |
| EX 9 | 1.39 | 1.52 | 0.02 | 0.01 |
| EX 10 | 1.28 | 1.34 | 0.01 | 0.01 |
| EX 11 | 1.84 | 1.58 | 0.02 | 0.02 |
| EX 12 | 1.20 | 1.35 | 0.01 | 0.01 |
| EX 13 | 1.73 | 1.46 | 0.01 | 0.01 |
| EX 14 | 3.40 | 3.21 | 0.01 | 0.01 |

TABLE 1-continued

| EXAMPLE | OTR BEFORE[1] | OTR AFTER[2] | WVTR BEFORE[3] | WVTR AFTER[4] |
|---|---|---|---|---|
| COMP. EX 15 | 1.05 | 12.0 | 0.02 | 0.10 |

[1]Oxygen transmission rate (cc/100 in$^2$/day) before being passed through former of Haysen VFFS machine (Examples 2, 4 and 6) or through 1/64" anvil of Mirapak VFFS machine (Examples 7, 9–14 and Comparative Example 15).
[2]Oxygen transmission rate (cc/100 in$^2$/day) after being passed through former of Haysen VFFS machine (Examples 2, 4 and 6) or through 1/64" anvil of Mirapak VFFS machine (Examples 7, 9–14 and Comparative Example 15).
[3]Water vapor transmission rate (g/100 in$^2$/day) before being passed through former of Haysen VFFS machine (Examples 2, 4 and 6) or through 1/64" anvil of Mirapak VFFS machine (Examples 7, 9–14 and Comparative Example 15).
[4]Water vapor transmission rate (g/100 in$^2$/day) after being passed through former of Haysen VFFS machine (Examples 2, 4 and 6) or through 1/64" anvil of Mirapak VFFS machine (Examples 7, 9–14 and Comparative Example 15).

What is claimed is:

1. A metallized biaxially oriented film comprising:
   (a) at least one polypropylene layer; and
   (b) a metallized skin layer comprising a blend of syndiotactic polypropylene, and a graft copolymer of a propylene polymer and maleic anhydride.

2. A film according to claim 1, wherein said propylene polymer of the graft copolymer of layer (b) is a polypropylene homopolymer or an ethylene-propylene copolymer.

3. A film according to claim 1, which is metallized with aluminum.

4. A laminated film structure, wherein a non-metallized biaxially oriented polypropylene film is laminated to the metallized biaxially oriented polypropylene film according to claim 3.

5. A film according to claim 1, wherein the skin layer on the surface opposite from said metallized skin layer comprises a polymer selected from the group consisting of a terpolymer of ethylene, propylene and butene; an ethylene-propylene copolymer; polyethylene; and mixtures thereof.

6. A film according to claim 4, wherein the skin layer on the surface opposite from said metallized skin layer comprises a polymer selected from the group consisting of a terpolymer of ethylene, propylene and butene; an ethylene-propylene copolymer; polyethylene; and mixtures thereof.

7. A film according to claim 1, wherein said syndiotactic polypropylene is a metallocene-catalyzed syndiotactic polypropylene.

8. A film according to claim 1, wherein said syndiotactic polypropylene has a syndiotacticity of about 75 to about 85% racemic pentads.

9. A metallized biaxially oriented film comprising:
   (a) at least one polypropylene layer;
   (b) a metallized skin layer comprising a blend of syndiotactic polypropylene and butylene-propylene copolymer; and
   (c) a second skin layer on a surface opposite from the metallized skin layer, wherein the second skin layer comprises a terpolymer of ethylene, propylene, and butene.

10. The metallized biaxially oriented film of claim 9, wherein the syndiotactic polypropylene is a metallocene-catalyzed syndiotactic polypropylene.

11. The metallized biaxially oriented film of claim 9, wherein the butylene-propylene copolymer comprises from 1 to 20 mol % butylene.

12. A laminated film structure, wherein a non-metallized biaxially oriented polypropylene film is laminated to a metallized biaxially oriented film, wherein the metallized biaxially oriented film comprises:
   (a) at least one polypropylene layer; and
   (b) a metallized skin layer comprising a blend of syndiotactic polypropylene and butylene-propylene copolymer.

13. The metallized biaxially oriented film of claim 12, wherein the syndiotactic polypropylene is a metallocene-catalyzed syndiotactic polypropylene.

14. The metallized biaxially oriented film of claim 12, wherein the butylene-propylene copolymer comprises from 1 to 20 mol % butylene.

* * * * *